United States Patent Office 3,781,347
Patented Dec. 25, 1973

---

3,781,347
PROCESS FOR PURIFICATION OF TEREPHTHALIC ACID
Richard V. Norton, Wilmington, Del., assignor to Sun Research and Development Co., Philadelphia, Pa.
No Drawing. Filed May 25, 1972, Ser. No. 257,027
Int. Cl. C07c 51/42
U.S. Cl. 260—525  5 Claims

ABSTRACT OF THE DISCLOSURE

A process for the purification of terephthalic acid containing an aldehyde impurity which comprises heating a solid ammonium salt of said terephthalic acid at a temperature of from about 200° C. to about 300° C. while sweeping said solid salt with steam.

---

Terephthalic acid is a well-known article of commerce employed as an intermediate to polyethylene terephthalate. In making this polymer from terephthalic acid it is necessary to employ a highly purified material and numerous purification processes are known in the art. In one technique, as detailed in Japanese Patent 44/20,616 (Izukichi Kataoka et al.) a solution of the terephthalic acid in ammonia water is first decolorized with carbon below 70° C., the solution is then heated to above 80° C. to separate monoammonium terephthalate, and finally the crystals of the salt are heated at 200° C. under reduced pressure to convert the salt to dry terephthalic acid crystals of high purity.

In another known technique for preparing terephthalic acid disclosed in U.S. 3,031,500 (Gasson et al., assigned to The Distillers Co., issued Apr. 24, 1962) diammonium terephthalate obtained by the hydrolysis of terephthalonitrile as described in U.S. 2,979,526 (Gasson et al., assigned to The Distillers Co., issued Apr. 11, 1961) is heated above 120° C. either as a dry solid or suspended in an inert liquid, the material being agitated during the reaction by mechanical means or by passing an inert gas through the system; e.g., hydrogen, nitrogen, carbon dioxide, or steam.

It is also known that the various processes for terephthalic acid give products with different types of impurities. Preparation of terephthalic acid by liquid phase oxidation of p-xylene yields terephthalic acid with impurities resulting from the partial oxidation of the methyl groups and usually comprise aldehydes (e.g., p-carboxylbenzaldehyde). Such impurities are, of course, different from those which are formed in the hydrolysis of terephthalonitrile to give ammonium terephthalate.

In accord with the invention a process is provided for purification of terephthalic acid containing aldehyde impurities which comprises reacting a solid ammonium salt of said terephthalic acid with steam at a temperature of from about 200° C. to about 300° C. In the present invention the steam acts as a reactant to convert the aldehyde impurity to terephthalic acid and although the manner by which the steam functions is not known precisely, it is believed that an aldimine is formed which reacts with an ammonium carboxylate group to form an imide that is, in turn, further reacted with water to form a carboxylic acid. The above sequence of reactions may be illustrated as follows (R and R' are the aromatic residues of the terephthalic acid entity):

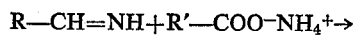

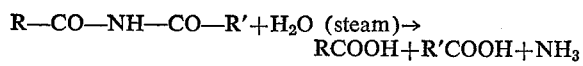

In carrying out the process of the reaction, the terephthalic acid is first converted to its ammonium salt and this is readily done by passing dry ammonia gas through a bed of the dry, solid terephthalic acid. The formation of the salt is accompanied by the generation of heat (heat of neutralization) and this may be dissipated by cooling the external surfaces of the vessel in which reaction occurs. Alternatively, the terephthalic acid may be converted to the salt by evaporating a solution of the acid salt obtained by reacting an aqueous slurry of the terephthalic acid with ammonium hydroxide or gaseous ammonia. In any of the techniques used, it is possible by controlling the molar amount of ammonia introduced, to form either the monoammonium salt, the diammonium salt or a mixture of both. After the salt is formed, the temperature of the solid salt is raised to the desired temperature and steam at a temperature of from about 200° to about 300° C., preferably 200° to 250° C., is passed into the vessel where the purification reaction occurs. It will be understood that any of the physical systems available in the art may be used for this process; e.g., fluidized bed, fixed bed, rotating kiln, and the like. However, intimate contact of the steam with the hot powder makes a moving bed process preferred.

It has been found unexpectedly that there is an optimum temperature for operation of the process at which maximum impurity is removed. When the salt purified is monoammonium terephthalate, this temperature is about 200° C. to about 220° C. and with the diammonium salt it is about 250° C. to about 260° C. Use of process temperatures much above or below these optimum values will result in a purified product, but less pure than obtainable at the optimum process temperatures.

In order to further illustrate the process of the invention the following examples are given:

EXAMPLES 1 TO 17

Impure terephthalic acid prepared from the liquid-phase cobalt-catalyzed oxidation of p-xylene and containing 250 p.p.m. p-carboxybenzaldehyde was converted to its ammonium salt by passing dry gaseous ammonia through a bed of the powdered terephthalic acid. The amount of ammonia introduced was varied to preferentially form monoammonium terephthalate (MAT) or diammonium terephthalate (DAT) as the sole products of reaction.

The powdered ammonium salt composition was then subjected to pyrolysis in a heated rotating glass tube by passing pyrolysis gas through the powder, the pyrolysis gas being preheated to the temperature of the ammonium salt bed. The following experiments illustrate the effect of different experimental parameters upon the purity of the final acid.

| Example No.: | Reactant | Pyrolysis Gas | Pyrolysis Temp. | p-Carboxybenzaldehyde in purified TPA, p.p.m. |
|---|---|---|---|---|
| 1 | DAT | Air | 250 | 265 |
| 2 | DAT | Air | 164 | 260 |
| 3 | DAT | Helium | 250 | 264 |
| 4 | DAT | do | 169 | 261 |
| 5 | DAT | Steam | 163 | 40 |
| 6 | DAT | do | 200 | 27 |
| 7 | DAT | do | 250 | 14 |
| 8 | DAT | do | 280 | 20 |
| 9 | DAT | do | 300 | 25 |
| 10 | MAT | Air | 165 | 260 |
| 11 | MAT | Air | 247 | 263 |
| 12 | MAT | Helium | 167 | 263 |
| 13 | MAT | Steam | 163 | 52 |
| 14 | MAT | do | 180 | 45 |
| 15 | MAT | do | 210 | 30 |
| 16 | MAT | do | 250 | 65 |
| 17 | MAT | do | 280 | 80 |

It will be observed from the above data that gases other than steam (e.g., air or helium) are not in any way effective in purifying the starting terephthalic acid. It is also seen from Examples 5 to 9 that a temperature of about 250° C. is optimum for diammonium terephthalate and as seen from Examples 13 to 17, about 210° is optimum for the mono-salt.

EXAMPLE 18

A mixture of 50 parts by weight of MAT and 50 parts by weight of DAT was treated with steam as described above at 200° C. The p-carboxybenzaldehyde content was reduced from 250 p.p.m. to 47 p.p.m. by the process.

It is clear from the above description and examples that the process of the invention provides a valuable contribution to the art of purifying terephthalic acid.

The invention claimed is:

1. A process for the purification of terephthalic acid containing an aldehyde impurity which comprises preparing a solid ammonium salt of said impure acid, and then heating said solid salt at a temperature of from about 200° to about 300° C. while sweeping said solid salt with steam.

2. The process of claim 1 where the salt is monoammonium terephthalate.

3. The process of claim 1 where the salt is diammonium terephthalate.

4. The process of claim 1 where the salt is monoammonium terephthalate and the temperature of heating is from about 200° C. to about 220° C.

5. The process of claim 1 where the salt is diammonium terephthalate and the temperature of heating is from about 250° C. to about 260° C.

References Cited

UNITED STATES PATENTS 3,364,256   1/1968   Ichikawa et al. _____ 260—525

FOREIGN PATENTS 825,375   12/1959   Great Britain _____ 260—525

LORRAINE A. WEINBERGER, Primary Examiner

R. S. WEISSBERG, Assistant Examiner